United States Patent [19]

Caflisch et al.

[11] Patent Number: 5,596,163

[45] Date of Patent: Jan. 21, 1997

[54] GAS GENERATOR IGNITING CAPSULE

[75] Inventors: Erwin Caflisch, Tamins; Jorgen Bonnevie, Falera, both of Switzerland

[73] Assignee: Ems-Patvag AG, Domat/Ems, Switzerland

[21] Appl. No.: 291,164

[22] Filed: Aug. 16, 1994

[30] Foreign Application Priority Data

Aug. 25, 1993 [CH] Switzerland ............ 02543/93
Aug. 25, 1993 [CH] Switzerland ............ 02544/93

[51] Int. Cl.⁶ .................................. F42B 3/18
[52] U.S. Cl. .................. 102/202.2; 102/202.7; 102/202.9; 102/202.14; 102/530
[58] Field of Search ............ 102/202.1, 202.2, 102/202.5, 202.7, 202.9, 202.14, 530, 531, 202.3, 202.8; 280/741; 422/166

[56] References Cited

U.S. PATENT DOCUMENTS

| | | | |
|---|---|---|---|
| 2,377,804 | 6/1945 | Narvarte | 102/202.2 |
| 3,181,464 | 5/1965 | Parker et al. | 102/202.7 |
| 3,244,103 | 4/1966 | Spickard | 102/202.5 |
| 3,272,127 | 9/1966 | Betts et al. | 102/202.5 |
| 3,420,174 | 1/1969 | Potter | 102/202.5 |
| 4,271,453 | 6/1981 | Yajima | 102/202.2 |
| 4,422,381 | 12/1983 | Barrett | 102/202.2 |
| 4,441,427 | 4/1984 | Barrett | 102/202.2 |
| 4,745,858 | 5/1988 | Harder | 102/202.2 |
| 4,959,011 | 9/1990 | Nilsson | 102/202.5 |
| 5,088,412 | 2/1992 | Patrichi | 102/202.5 |
| 5,109,772 | 5/1992 | Cunningham | 102/275.11 |
| 5,345,876 | 9/1994 | Rose et al. | 102/531 |
| 5,403,036 | 4/1995 | Zakula et al. | 102/202.5 |
| 5,423,261 | 6/1995 | Bernardy et al. | 102/202.5 |
| 5,433,147 | 7/1995 | Brede et al. | 102/202.2 |

FOREIGN PATENT DOCUMENTS

| | | | |
|---|---|---|---|
| 269475 | 6/1988 | European Pat. Off. | 102/202.2 |
| 3415625 | 10/1985 | Germany | F42C 11/00 |
| 4102275 | 6/1992 | Germany . | |

*Primary Examiner*—Harold J. Tudor
*Attorney, Agent, or Firm*—Schweitzer Cornman & Gross

[57] ABSTRACT

A gas generator igniting capsule for air bags and belt tensioning means has one or more contact pins connected to an igniting element constructed as a glow wire, located in a first detonator layer of a multiple charge detonator construction.

12 Claims, 6 Drawing Sheets

FIG. 12 form GAS GENERATOR IGNITING CAPSULE

The present invention relates to a gas generator igniting device or capsule having an electrical igniter and a detonator, the electrical igniter being provided with a contact bridge having a defined electrical resistance, and at least one contact pin attached to the contact bridge and forming a plug-type connection.

BACKGROUND OF THE INVENTION

Electrical/pyrotechnic igniters in gas generators for impact protection systems (such as vehicle air bags and belt tensioning means) are generally known, as exemplified by DE-C1-41 02 275.

while the use of electronic igniting devices in vehicles has spread, so has the use of mobile radio equipment, resulting in the increased risk of momentary voltage surges in the vehicle electrical system which can activate an unprotected gas generator. For this reason, special measures are necessary so that any uncontrolled voltage peaks occurring in the vehicle electrical system does cause the triggering of the protection system.

DE-A1-34 15 625 discloses a high tension igniter with a predetermined spark gap. Circular and linear cutouts are provided in a metal layer and are connected to hollow pieces placed on planar manner, and are intended to serve on the one hand as voltage surge diverters and on the other hand as ignition bridges. The assembly is joined together by means of insulating rings and melt-type adhesives.

Such a construction requires the use of complicated photoetching processes or expensive laser cutting equipment to produce the required gap-shaped cutouts. Moreover, there is a risk of high electrostatic charges cutting through the insulating adhesive provided and inadvertently igniting an adjacent igniting composition which forms the highly explosive detonator.

Additionally, U.S. Pat. No. 5,109,772 discloses that a mixture of boron potassium nitrate, identified as $BKNO_3$ is a rapid ignition means for pyrotechnic fuel and as such may be used for the propagation of the ignition of gas-generating materials, such as may be used for inflating air bags. In order to achieve the desired effect, $BKNO_3$ is applied over a large surface distributed along the entire gas generator. Plates forming chambers are coated in the same manner. Coating is achieved by dipping the corresponding mechanical parts in an aqueous $BKNO_3$ solution, with a subsequent drying procedure. This type of gas generator is ignited by a conventional thermo-electric igniter. Such a construction is relatively complicated and produces only an improved flaming distribution to a gas generator which has already been ignited.

In the course of further technical developments of air bags and pyrotechnically activated belt tensioning means, it has been found that known systems cause pressure pulses on ignition, can have a negative effect on gas propagation and an adverse influence on the desired gentle inflation of the air bag, or can cause mechanical overloads. Similar results can occur in the case of pyrotechnic belt tensioning means, where the pump plunger can be acted upon too quickly by the gas generation.

It is thus the object of the present invention to eliminate disadvantages of the known art and to provide a gas generator igniting capsule of a type which adequately increases the triggering and operational reliability of air bags and pyrotechnic belt tensioning means and the like and prevents the generation of compressed gas in a manner which would be dangerous, undesired and/or excessively harsh and thus also hazardous to the system in which the gas generator is employed.

The invention contemplates an igniting capsule having a resistive electrical igniter of defined resistance joined to at least one contact pin. A conductive ring encircles the contact pin and is spaced from the contact pin to produce a defined gap therebetween. The ring serves as a counter electrode to shunt voltage surges to earth. The igniter is in contact with a layer of a multilayer detonator charge. The contact pin defines a plug-like connection for interconnection with an electrical input line.

The subject of the present invention is capable of being integrated into known apparatus for increasing the safety of the occupants of a vehicle or aircraft in which the apparatus is employed.

The structural elements forming the apparatus are capable of being integrated into the igniter easily and without positioning aids. Sensitive insulating layers, insulating adhesives and the like which are also detrimental to mass production are eliminated.

The arrangement of the electrically conductive parts of the present invention insures that any voltage surge is diverted to ground and is thus made harmless. At the same time, the utilization of at least two different detonators enables the igniter chain to be matched to a proper detonation rate for the engineering of the system in the region of priming. In practice, the use of two detonators in the igniter primarily results in reliable ignition of a first detonator layer and then propagation of the ignition at a reduced ignition rate in a second, less highly explosive detonator layer. As a result of the two detonator layers being pressed together, the desired priming effect is also produced in the less highly explosive detonator.

In a preferred embodiment a galvanically conductive ring is constructed with sharp edges so that any sparkover takes place at a site defined by the partially increased field strength resulting from such a construction. The combination of the galvanically conductive ring with a seal is particularly convenient, since it reduces the structural height of the igniter. The bore of the ring may be frustoconical.

Mechanical integration of the contact pins into the plug socket reduces the necessary dimensions and at the same time provides for improved axial guidance of the pins.

Peripheral contact with the conductive ring can be employed to establish electrical connection therewith. Alternatively, the ring can be placed on a flange of the metal igniter housing so that the structural height of the igniter is additionally reduced. A ring structure which projects by means of contact faces out of a housing made of synthetic material and is contacted by a conductive gas generator housing is particularly preferred.

The use of lead styphnate as a first detonator provides the necessary reliability for ignition, even in combination with further detonators which are not highly explosive. $BKNO_3$ in processed form has proved extremely favorable as the second detonator. The ratios of the two detonators may be varied in accordance with required pressure levels. In addition, the mixing ratio of $BKNO_3$ can be adapted to a desired optimum pressure curve, while the particle size of the lead trizinate can be varied to obtain improved functional reliability. The controlled selection of the particle sizes or crystals of the $BKNO_3$ mixture also serve to improve the quality of the ignition procedure.

BRIEF DESCRIPTION OF THE DRAWINGS

A fuller understanding of the invention will be achieved upon consideration of the disclosure of illustrative embodiments of the subject of the invention as described in more detail below, with reference to the annexed drawings, in which.

DETAILED DESCRIPTION OF THE INVENTION

Figure 1A:
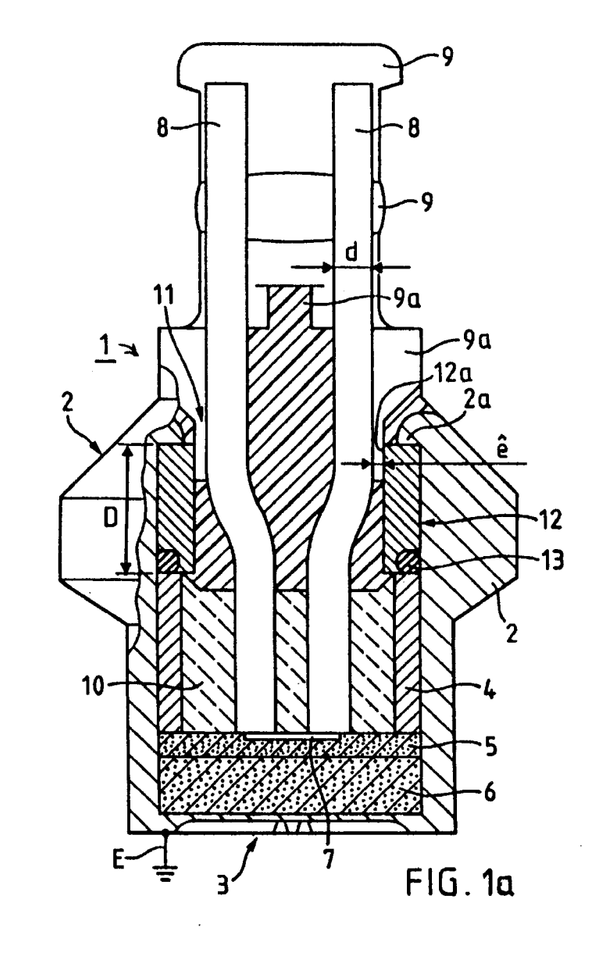
FIG. 1a shows a sectional illustration of an igniter of the present invention which is encapsulated in a gas-tight manner and which has an integrated voltage surge diverter.
Figure 1B:
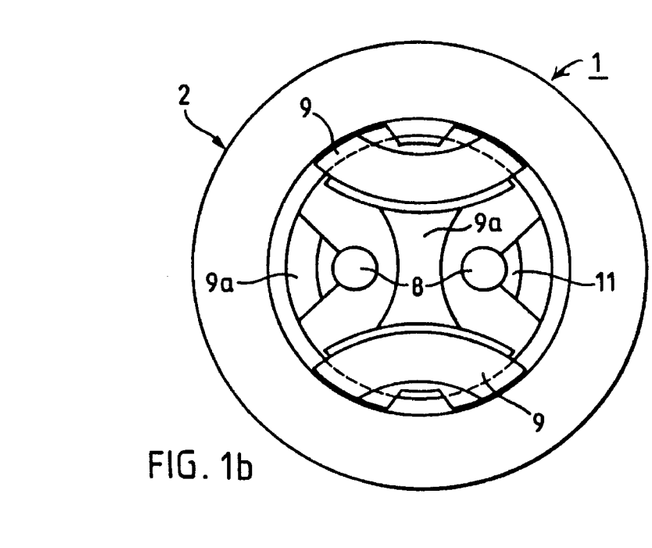
FIG. 1b shows the igniter of FIG. 1a viewed from above.

Referring initially to FIGS. 1a and 1b, 1 generally designates a glow wire igniter in accordance with the present invention. Housing 2 is galvanically connected to earth ground E and is made of an aluminum alloy known per se. Notches 3 are provided at its lower end, which represent predetermined break points for the igniter housing which rupture during ignition, creating passageways out of which the hot gas which is formed after the electrical ignition can pass into a gas generator (not illustrated) or can ignite an igniting layer thereof.

A fitting ring 4 is laid in the housing 2 and carries a glass insulator 10 in which electrical contact pins 8 are cast concentrically. The bottoms of the two contact pins 8, each of consistent diameter "d" are machined to be planar with the lower end of the insulator 10; a glow wire is welded to the ends of the pins and serves as an igniting element 7. The pins are each formed with a medial bend whereby the upper ends of the pins are separated by a greater distance than the lower ends. The diameter of each of the pins is d.

A first priming layer 5 is formed on the igniting means 7, against which a second priming layer 6 bears. Both igniting layers 5 and 6 are pressed at relatively high pressure so that they form a compact unit.

The upper ends of the two contact pins 8 are guided through a plug socket 9a. A plug shell 9 surrounds the upper ends of pins and contains a known mechanical closure means to allow proper electrical contact to be made and maintained between the pins and a mating connector (not shown) even under extreme vibration conditions.

A galvanically conductive ring 12, which is inserted with a form fit in the internal bore of the housing 2, surrounds a portion of the contact pins 8 concentrically with its own bore 12a. The ring extends upwardly beyond the bent portion of the pins and forms a gap ê between the bore-forming surface and the contact pins over a correspondingly short region. The structural height D of the ring 12 is at least twice the diameter d of the contact pins. The upper edge of the ring bore 12a defines a sharp edge, allowing an electrical field between the contact pins and the ring to be concentrated at that point. As best seen in FIG. 1b, a cutout 11 is formed in the plug socket 9a which provides an air gap of the spacing ê between the pins and the ring and through which voltage surges can pass through to the outside air. The shape and orientation of the contact pins 8 with the plug socket 9a and the plug fuse 9 can also be seen from FIG. 1b.

An annular groove 14 is provided in the lower end of the ring 12, and an O-ring 13 is inserted therein which effects secure sealing of the ring 12 with respect to the metal housing 2. The contact pins and ring arrangement, which is constructed to be very compact, is joined together in a mechanically fixed and gas-tight manner in the housing by a flanged housing portion 2a.

Figure 2:
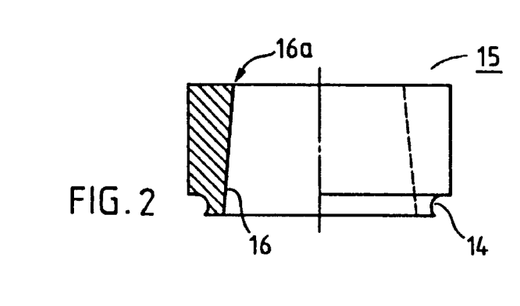
FIG. 2 shows in detail a portion of an alternative construction for a voltage surge diverter ring as used in the invention.

The galvanically conductive ring 15 shown in FIG. 2 is constructed in a similar manner to the ring 12 of FIG. 1a, but in this case includes a frustoconical construction of the bore 16, which ends at the sharp edge 16a in a manner similar to the edge of bore 12a FIG. 1a, and which produces a localized high field strength in the event of any voltage surges. In relation to the voltage surge behavior, this embodiment is more favorable than a purely axially symmetrical bore. The annular groove 14 is also clearly shown in this Figure.

Figure 3:
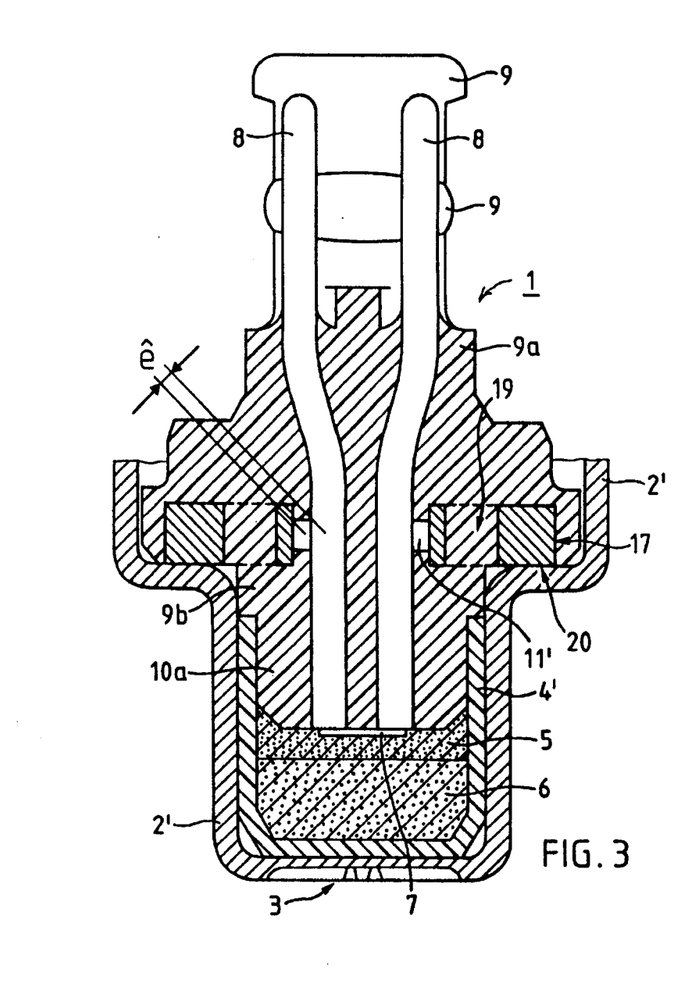
FIG. 3 shows a partially sectional illustration of a second embodiment of the igniter of the present invention with a metal housing.

The igniter of FIG. 3 is constructed in a similar manner to the igniter according to FIG. 1a, but in this case an insulator 10a of a synthetic material rather than glass, which projects into a charge cap 4', also of synthetic material, is provided. The bottom of the charge cap immediately deteriorates upon igniter operation, allowing the blast to rupture and pass out through the notches 3.

Figure 4:
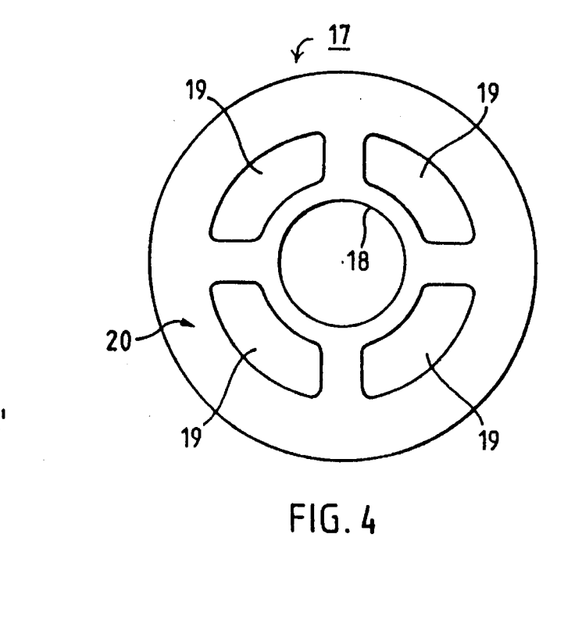
FIG. 4 shows a plan view of the voltage surge diverter ring of FIG. 3.

Furthermore, the galvanically conductive ring 17 is of small structural height, and lies on an inner rim of a metal housing 2' by means of a contact face 20. The plug socket 9a, which may be constructed as a synthetic die cast part, engages the apertures 19 in the ring 17, best seen in FIG. 4, and fixes the arrangement radially symmetrically and is inserted in an adjoining flange 9b portion of insulator 10a.

Plug socket 9a surrounds the contact pins 8 so that the interior space or gap formed by the cutout 11' between the plug socket 9a and the insulator 10a is protected from environmental influences. Once again, the gap spacing ê between the contact pins 8 and the ring 17 is matched to the predetermined or provided disruptive field strength. The structural shaping of the conductive ring 17 with its bore 18 and the apertures 19 can be seen from FIG. 4.

Figure 5:
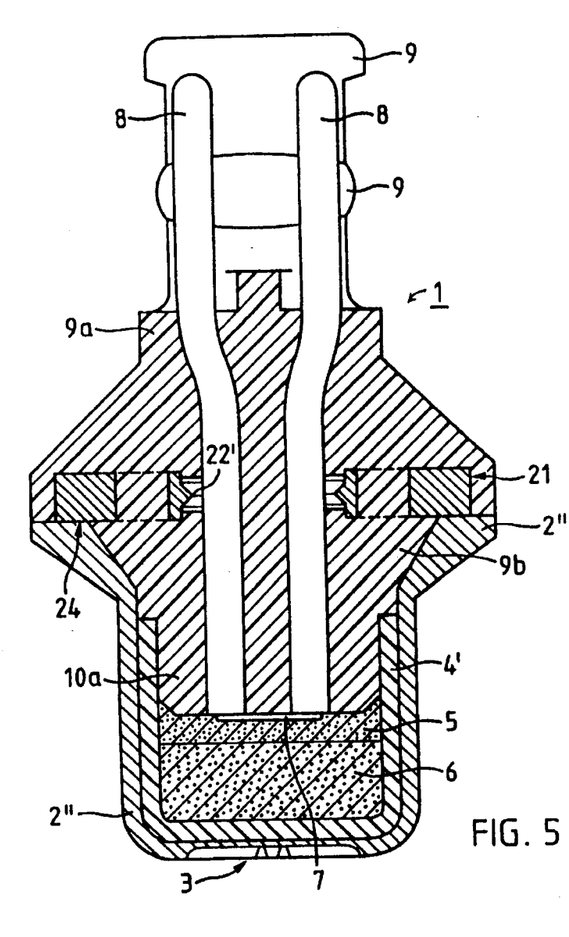
FIG. 5 shows a partially sectional illustration of an igniter of the present invention which may be largely made from synthetic material.
Figure 6:
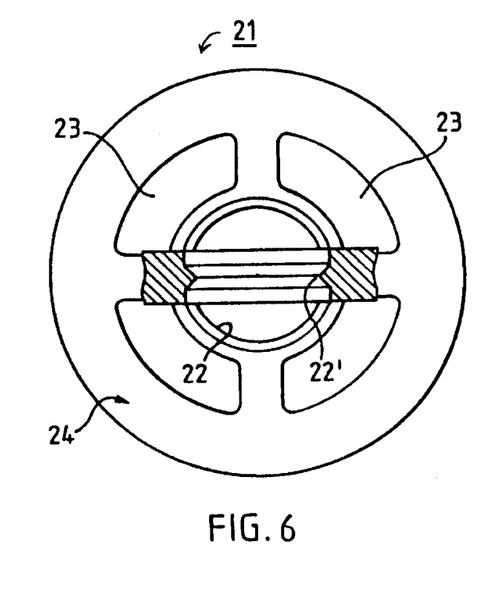
FIG. 6 is a top plan view of the voltage surge diverter ring of FIG. 5 with a rotated insert portion present and an elevation view of the center of the ring.

The igniter according to FIG. 5 is structured in a similar manner, but in this case a galvanic or conductive ring 21 which has a prismatic sharp peripheral inner edge 22' in its bore 22 is provided. This embodiment has the advantage that it produces a toroidal electrical field whereof the maximum field strength lies in half the structural height of the ring 21 and is distributed symmetrically about the edge 22'. For drawing reasons, the spacing ê is not illustrated here. FIG. 6 again shows the apertures 23 in the ring 21 which accommodate the portions of plug socket 9a extending therethrough. The housing 2" (FIG. 5) used here is also of metal; contact between the face 24 of the ring 21 and the housing 2" form the connection to earth.

Figure 7:
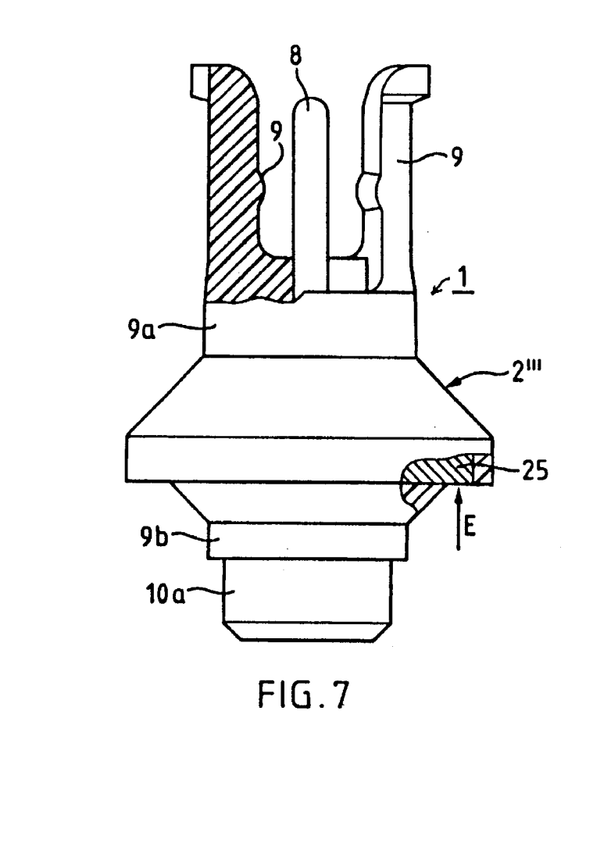
FIG. 7 shows a partially sectional illustration of an igniter of the present invention having a synthetic housing.
Figure 8:
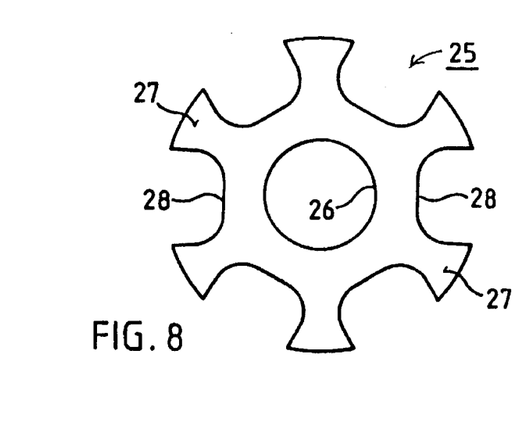
FIG. 8 shows a plan view of a galvanically conductive ring inserted in the housing of FIG. 7.
Figure 9:
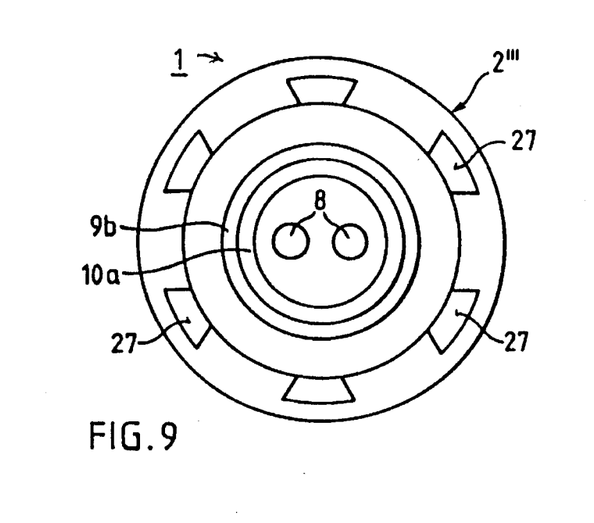
FIG. 9 shows a plan view from below of the igniter of FIG. 7, without a charge cap and with the contact faces of the conductive ring exposed.

In FIG. 7, a partial illustration of an igniter made of synthetic material can be seen. The housing part 2''' made of polyamide, contains the conductive ring 25 which is constructed in the manner of a cam wheel, as best seen in FIG. 8. Its contact arms or faces 27, are exposed, as seen in FIG. 9, and serve to connect to the earth line E by contact with the metal face of a gas generator (not illustrated) to which the igniter is joined. Once again, recesses serve to fix the ring 25 concentrically with its bore 26.

The bottom plan view of FIG. 9 further depicts the two contact pins 8 arranged in the center of the igniter, with their bottom ends planar with the bottom face of synthetic insulator 10a. The glow wire igniting element, along the detonator layers which are in a charge cap to be affixed upon the insulator 10a are not shown.

The construction of an igniter in accordance with the present invention, as illustrated herein allow the spacing provided between the minimum bore of the galvanically conductive rings and the diameter of the contact pins to be precisely developed and maintained. Such spacing may be, for example, in the order of magnitude of 0.5 mm. The overvoltage protection thus resulting (25 kV in accordance with German Standard VG 95378, Part 11) is thus insured in a reproducible manner. Other spacings can be chosen, as known in the art, to provide overvoltage protection in accordance with expected overvoltage conditions.

The materials used for constructing the igniter are known per se. Thus, the conductive ring is preferably made of stainless machining steel (Cr/Ni alloy); the glow wire may be of an Ni/Cr alloy. The contact pins are preferably made from an Ni/Fe alloy and are gold-plated in their connection region. In particular, glass fibre-reinforced Polyamide 6.6 (trademark of the company EMS Chemie AG, Domat-Ems) has proved useful as the synthetic material.

Figure 10:
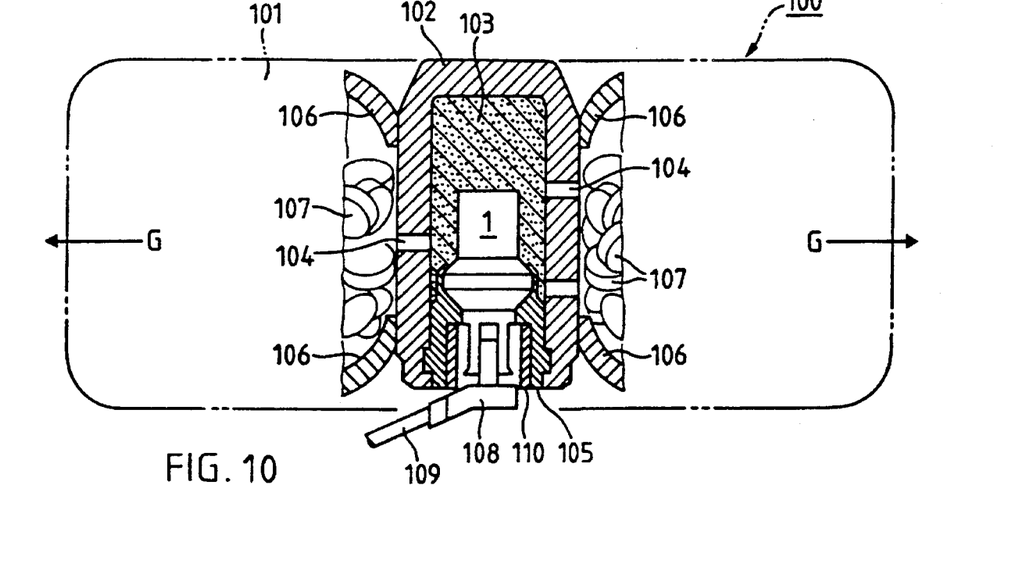
FIG. 10 shows a gas generator having an igniting chain according to the present invention.

In FIG. 10, a generally pot-shaped gas generator is designated 100. It substantially comprises a combustion chamber housing 101, having known chambers, baffles and filter elements which are not illustrated in more detail, and has in its center a cylindrical central pipe 102 closed at its upper end in which a propagation charge 103 of $BKNO_3$ is located. Passages 104 in the form of bores insure that, after ignition, gas passes outwardly from the pipe into the combustion chamber 106, which is filled with pyrotechnic compositions 107 known per se, in so-called pellet form. The igniting signal is delivered to igniter 1 by way of an electrical plug 108 and two-pin igniting cable 109 via sensors and is generated in a known manner.

Figure 11:
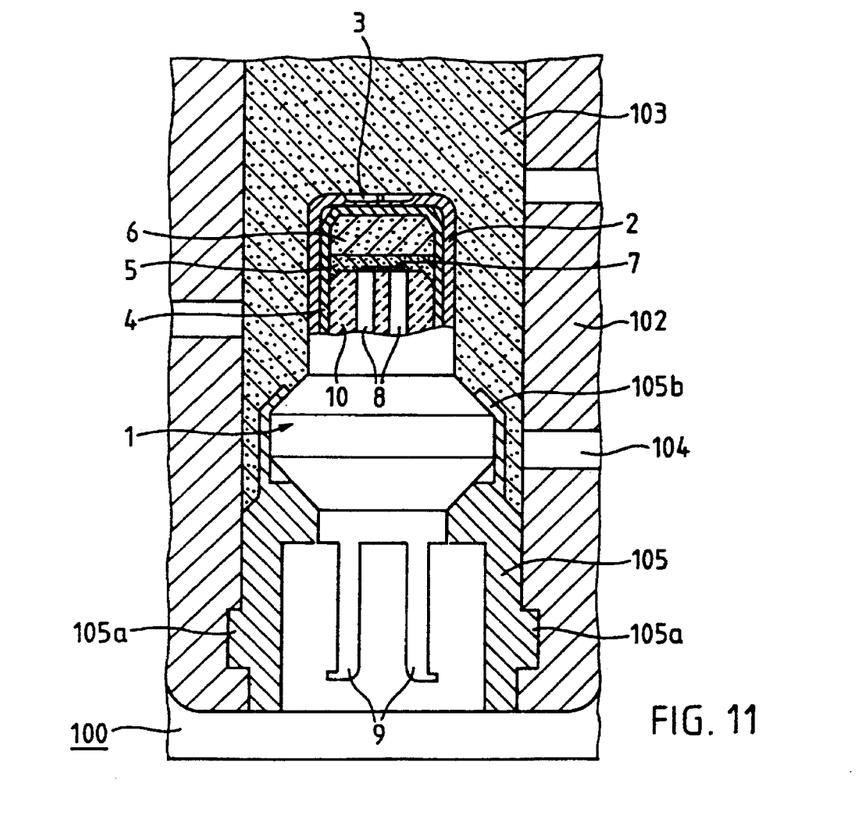
FIG. 11 shows an enlarged sectional illustration of the gas generator of FIG. 10 detailing the construction of the igniter.

The igniter 1 is held in a centered manner axially symmetrically within the pipe 102 by a carrier flange 105 having a bracket-shaped flange portion 105b, best seen in FIG. 11, which engages a portion of the igniter. A securing collar portion 105a of the carrier flange prevents axial displacement, and additionally a securing bushing 110 (FIG. 10) further locks the igniter in place.

The housing 2, a metal capsule produced by flanging, contains notches 3 on its end face which represent predetermined break points and insure a controlled passage of gas to the propagation charge 103. Within the capsule 2 is a charge cap 4 made of synthetic material, in which a first detonator 5 and a second detonator 6 are pressed in under pressure. Glow wire 7 is embedded in the first detonator 5 and forms a resistance bridge between the two contact pins 8, acting as an electrical igniting means. The contact pins 8 are cast into an insulator 10 made of glass with a flat end face.

The propagation charge 103 and the second detonator 6 may be of the same material, such as a mixture of boron potassium nitrate ($BKNO_3$). The first detonator layer 5 may be of lead trinitroresorcinate, also called lead styphnate.

Figure 12:
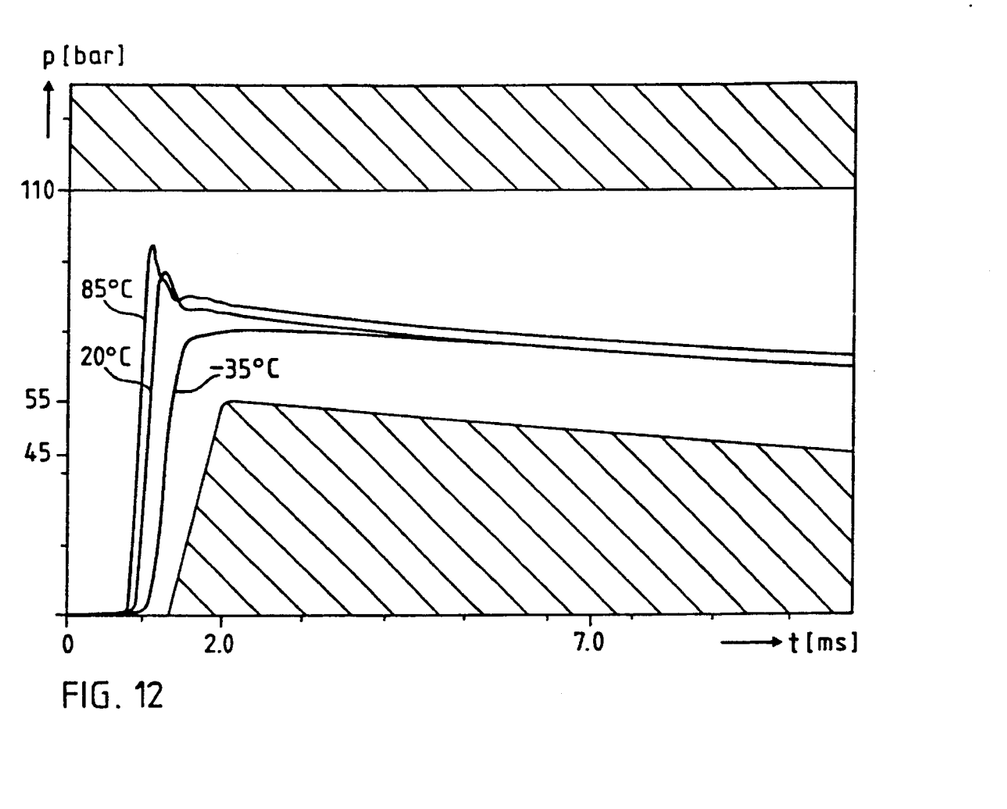
FIG. 12 shows characteristic pressure curves resulting from the operation of an igniter accordingly to the present invention at different temperatures.

As can be seen from FIG. 12, tests performed on an igniter of the present invention in a test capsule (test bomb) with a volume of 3 $cm^3$ shows that there is established within approximately 1 ms a pressure of around 90 bar, which falls only very slowly during a further interval of 10 ms. with an ambient temperature of 85° C. a maximum pressure of 97 bar is built within 1 ms to 2 ms, falls to 80 bar after 0.5 ms and is still 60 bar after approximately 10 ms. At 20° C. the maximum pressure is 90 bar, after a further 0.5 ms approximately 80 bar, and after 7 ms sinks to approximately 70 bar. Impermissible pressure regions are drawn as hatched areas in the graph.

The subject of the invention maintains acceptable gas pressure levels even at very low temperature. At −35° C., a pressure of approximately 70 bar is built up within less than 2.0 ms, and is maintained for more than 10 ms.

Such pressure curves in a gas generator having the igniter according to the present invention are essential to reliable functioning of the impact protection system.

Detonator layers which have proved to be optimal are those having a pressed first detonator mass of 30 mg of trizinate and 75 mg of pressed boron potassium nitrate as the second detonator. The ratio of boron to potassium nitrate is 40% by weight of B and 60% by weight of $KNO_3$. Particle sizes of boron in the range of 40 to 70 μm have proved successful, while a trizinate particle size in the range of 80 to 120 μm is effective. The weight ratio of first to second detonator layers can vary between 1:2 and 1:5 and the ratio of boron to potassium nitrate can vary between 10 and 70 percent boron (90 to 30 percent $KNO_3$) to control the gas evolution on priming in the igniting chain to allow it to be matched to the physical properties of an air bag or to its mechanical load capacity. Similarly, the pressure graph and other system parameters of the gas generator can be matched to the kinetic conditions of a belt tensioning means plunger and the associated reeling-in mechanism.

To achieve a priming effect of the two detonator layers, it is necessary to press them in the capsule 2; pressing pressures of up to 10,000 $N/cm^2$ have proved convenient. Surprisingly, no false ignition occurred even at considerably higher pressures.

One skilled in the art can appreciate that more than two detonator layers can also be present in the igniting capsule to allow the igniting chain to be adapted for a gentle pressure build-up dependent on the system. Similarly, conventional detonators can also be used for matching to the desired pressure graph, generally the igniting chain beginning with the more highly explosive detonator and being propagated to the less highly explosive detonators.

We claim:

1. A gas generator igniting capsule for use in an igniting apparatus, comprising an electrical igniter and a detonator, the electrical igniter having a contact bridge of a defined electrical resistance and two elongated contact pins of constant diameter being attached to the contact bridge;

said contact pins being directed towards an igniting element within a housing with a portion of each of said pins extending axially through a concentric bore of a galvanically conductive cylindrical ring mounted in said housing, a lower portion of said pins being surrounded and supported by an insulator, said insulator being mounted in a lower end of said housing by a fitting ring;

said cylindrical ring being located above said fitting ring and having a height of at least twice the diameter of the contact pins and being connected to an earth line of the igniting apparatus;

said contact pin portions being separated by a distance from said cylindrical ring matched to a disruptive field strength, whereby a voltage surge occurring at the contact pin is diverted across said distance to said earth line;

an insulating plug socket mountable upon said housing and surrounding said portions of said pins within the bore of said cylindrical ring, said plug socket having a cut-out portion between said pins and said cylindrical ring defining an air gap of said disruptive field strength distance between said pins and said cylindrical ring;

said detonator comprising at least two detonator portions provided in the igniting capsule, a second portion being less highly explosive than a first portion;

said first portion being in contact with said igniting means and being an organometallic detonator;

said second portion comprising an inorganic detonator mixture;

said first and second portions each being pressed into layer form and encapsulated within said capsule in a pressure-tight manner.

2. A gas generator igniting capsule according to claim 1, wherein the bore of the cylindrical ring is constructed with a sharp edge.

3. A gas generator igniting capsule according to claim 1, wherein the conductive cylindrical ring includes an annular groove; said capsule further comprising an elastomeric sealing ring received in said annular groove.

4. A gas generator igniting capsule according to claim 1, wherein said bore of said cylindrical ring is frustoconical.

5. A gas generator igniting capsule according to claim 1, wherein said conductive ring is at least partially in contact with said housing, said housing forming a galvanic connection to the earth line.

6. A gas generator igniting capsule according to claim 1, wherein reactive components of the second detonator portion are boron and potassium nitrate.

7. A gas generator igniting capsule according to claim 1, wherein said first detonator portion is lead trinitroresorcinate.

8. A gas generator igniting capsule according to claim 1, wherein the ratio by weight of the first detonator portion to the second detonator portion is in the range of 1:2 to 1:5.

9. A gas generator igniting capsule according to claim 6, wherein the ratio of boron to potassium nitrate is in the range of 10 to 70% by weight of boron and 90 to 30% by weight of potassium nitrate.

10. A gas generator igniting capsule according to claim 7, wherein the lead trinitroresorcinate has a particle size of about 80 µm.

11. A gas generator igniting capsule according to claim 9, wherein the boron potassium nitrate has an average particle size from 40 µm to 70 µm.

12. A gas generator igniting capsule according to claim 1, wherein the igniting means is a glow wire.

* * * * *